UNITED STATES PATENT OFFICE.

FLORENTINE J. MACHALSKE, OF BROOKLYN, NEW YORK, ASSIGNOR TO FREDERICK DARLINGTON, OF GREAT BARRINGTON, MASSACHUSETTS.

PROCESS OF PRODUCING ALKALI AND ALKALINE-EARTH-METAL HYDRIDS.

No. 800,380.      Specification of Letters Patent.      Patented Sept. 26, 1905.

Application filed July 12, 1905. Serial No. 269,424.

*To all whom it may concern:*

Be it known that I, FLORENTINE J. MACHALSKE, a citizen of the United States, residing at Brooklyn, in the county of Kings and State of New York, have invented certain new and useful Improvements in Processes of Producing Alkali and Alkaline-Earth-Metal Hydrids, of which the following is a specification.

According to this process a compound of an alkali or an alkaline-earth metal—for example, an oxid, carbonate, chlorid, sulfate, sulfid, carbid, or cyanamid—or a mixture of two or more of these compounds is heated to a high temperature, preferably in an electric furnace, and is then subjected to the action of a saturated hydrocarbon, specifically methane or natural gas, thereby producing a hydrid of the metal and by-products dependent on the compound employed.

For the purpose of illustration a series of typical reactions will be described in which a calcium compound is employed, it being understood that the mode of procedure and the reactions when compounds of other metals are used are precisely similar.

The compound is preferably crushed and dehydrated and heated to the required temperature in an electric furnace of the resistance type, an electric current, preferably alternating, of from two thousand amperes at fifty volts to three thousand three hundred and fifty amperes at thirty volts being employed in a furnace of the usual size. A stream of natural gas is then introduced into the furnace, and the reaction between the heated metallic compound and the hydrocarbon proceeds until substantially all of the metal has been converted into a hydrid. A non-oxidizing atmosphere is maintained in the furnace during the operation.

When calcium oxid and methane are the reacting compounds, the products are calcium hydrid, carbon monoxid, and hydrogen, the reaction being represented by the following equation:

(1) $CaO + CH_4 = CaH_2 + CO + H_2$.

When a carbonate is employed, the products are the same as with an oxid, the reaction being as follows:

(2) $CaCO_3 + 2CH_4 = CaH_2 + 3CO + 6H$.

When chlorids of the metals are employed, the chlorin combines with the carbon of the methane to produce chlorids of carbon, a valuable by-product, the reactions being represented by the equations:

(3) $2CaCl_2 + 2CH_4 = 2CaH_2 + 4H + C_2Cl_4$.

(4) $3CaCl_2 + 2CH_4 = 3CaH_2 + 2H + C_2Cl_6$.

The reaction for the sulfate is represented by the equation:

(5) $CaSO_4 + CH_4 = CaH_2 + CO + H_2O + SO_2$.

When a sulfid is employed, the by-product is thioformaldehyde, the reaction being as follows:

(6) $3CaS + 3CH_4 = 3CaH_2 + (H_2CS)_3$.

Either a carbid or a cyanamid of one metal or a double carbid of cyanamid may be employed, the several reactions being represented by the equations:

(7) $CaC_2 + CH_4 = CaH_2 + 3C + 2H$.

(8) $CaCN_2 + CH_4 = CaH_2 + 2HCN$.

(9) $[CaC_2 + Na_2C_2] + CH_4 =$
$\qquad [CaH_2 + Na_2H_2] + 5C$.

(10) $[CaCN_2 + Na_2CN_2] + CH_4 =$
$\qquad [CaH_2 + Na_2H_2] + 3CN + N$.

The charge may also consist of a mixture of two or more different compounds of the metal or of different metals. When a mixture of calcium cyanamid and calcium sulfid is used, the reaction is as follows:

(11) $[CaCN_2 + 2CaS] + 2CH_4 =$
$\qquad 3CaH_2 + C + 2HCNS$.

Alkali and alkaline-earth-metal hydrids are a convenient source of hydrogen, which is evolved when the hydrid is treated with water. The hydrids may be produced by this process at such a low cost as to make them commercially available for this purpose.

I claim—

1. The process of producing alkali and alkaline-earth-metal hydrids, which consists in reacting with a saturated hydrocarbon on a compound of an alkali or an alkaline-earth metal at a temperature sufficient to effect reduction of the compound and combination of its base with hydrogen, as set forth.

2. The process of producing alkali and alkaline-earth-metal hydrids, which consists in electrically heating to a high temperature a compound of an alkali or an alkaline-earth metal, and reacting on the heated compound with a saturated hydrocarbon, as set forth.

3. The process of producing alkali and alkaline-earth-metal hydrids, which consists in reacting with methane on a compound of an alkali or an alkaline-earth metal at a temperature sufficient to effect reduction of the compound and combination of its base with hydrogen, as set forth.

4. The process of producing alkali and alkaline-earth-metal hydrids, which consists in electrically heating to a high temperature a compound of an alkali or an alkaline-earth metal, and reacting on the heated compound with methane, as set forth.

In testimony whereof I affix my signature in presence of two witnesses.

FLORENTINE J. MACHALSKE.

Witnesses:
 JOHN H. MORCH,
 BERNHARD LIETZ.